E. M. LEWIS.
BICYCLE CONSTRUCTION.
APPLICATION FILED SEPT. 2, 1919.
1,388,961.
Patented Aug. 30, 1921.
2 SHEETS—SHEET 1.
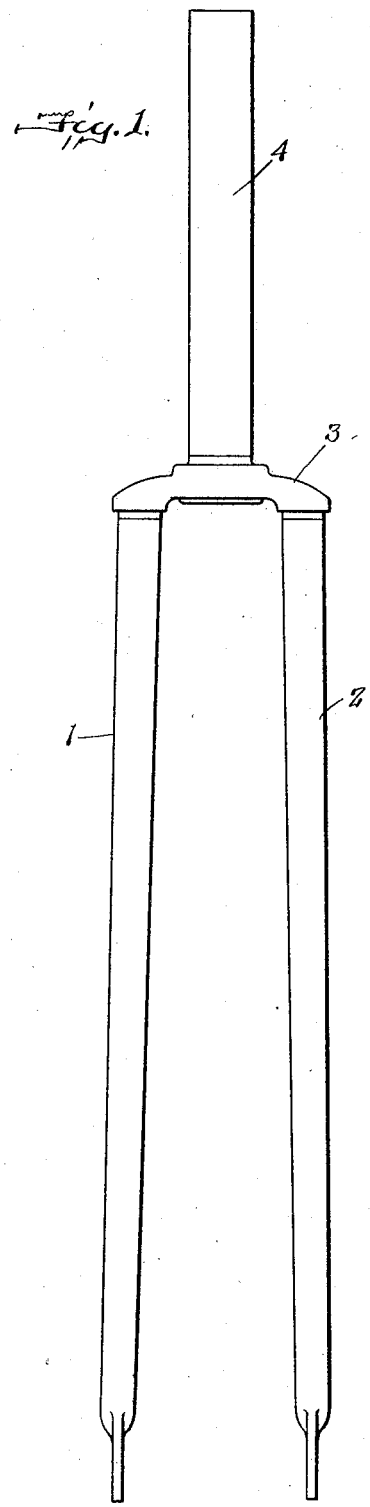
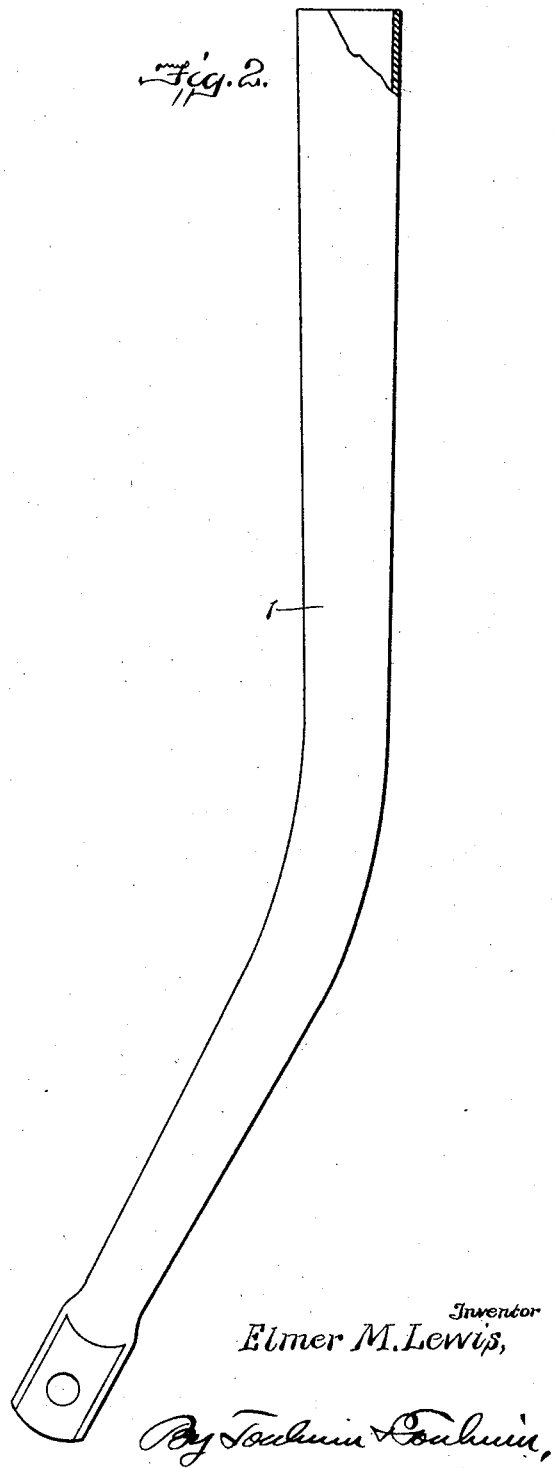
Inventor
Elmer M. Lewis,
Attorneys

E. M. LEWIS.
BICYCLE CONSTRUCTION.
APPLICATION FILED SEPT. 2, 1919.

1,388,961.

Patented Aug. 30, 1921.
2 SHEETS—SHEET 2.

Inventor
Elmer M. Lewis,

Attorneys

UNITED STATES PATENT OFFICE.

ELMER M. LEWIS, OF DAYTON, OHIO, ASSIGNOR TO THE DAVIS SEWING MACHINE COMPANY, OF DAYTON, OHIO, A CORPORATION OF OHIO.

BICYCLE CONSTRUCTION.

1,388,961.          Specification of Letters Patent.     Patented Aug. 30, 1921.

Application filed September 2, 1919. Serial No. 321,175.

*To all whom it may concern:*

Be it known that I, ELMER M. LEWIS, a citizen of the United States, residing at Dayton, in the county of Montgomery and State of Ohio, have invented certain new and useful Improvements in Bicycle Construction, of which the following is a specification, reference being had therein to the accompanying drawing.

This invention relates to improvements in bicycle construction, having particular reference to an improved bicycle fork.

The main object realized in this invention is the production of a better and cheaper bicycle fork, and simplifying of the manufacturing operations entering into its production.

Heretofore it has been common practice to construct bicycle forks from four or more separate pieces, consisting of the fork head forging, the fork stem, and the opposite fork members; these parts being reinforced at their respective junctures and brazed to form joints of the required strength.

This method of manufacturing involved numerous operations, such as drilling, turning and profiling of the fork head forging, machining the butt ends of the forks and the fork stem, and then pinning and dip brazing the joints. The rough joints thus form required pickling, stripping, filing and scraping operations to reduce the joints to symmetrical dimensions, the fork being finished by a strapping operation to remove all scale and burnt material remaining from the brazing operation and to smooth and polish the parts prior to enameling.

In my present invention a large part of these operations are eliminated, a better fork is produced and at greatly reduced cost,—a saving of at least fifty per cent. being effected in manufacturing cost.

The present invention relates to the improved fork itself, a separate application relative to the new process of manufacturing entering into the production of the improved product being filed of even date herewith, Ser. No. 321,176.

Figure 4:
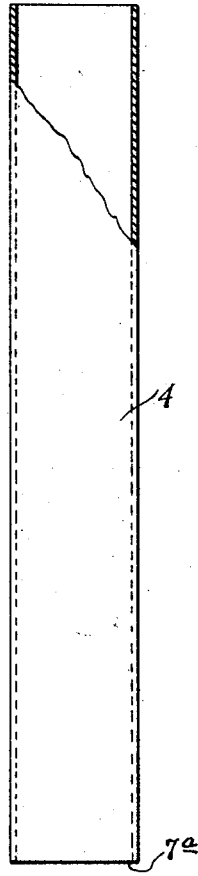
Figure 6:
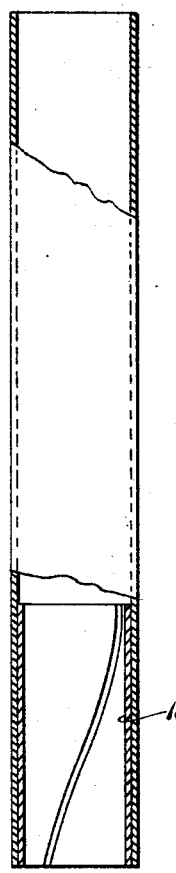
Figure 3:
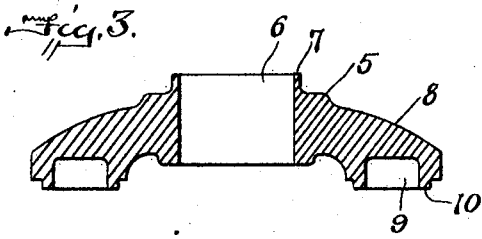
Figure 5:
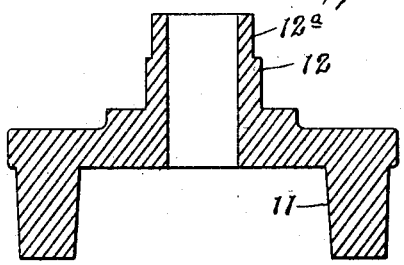

In the accompanying drawings,

Figure 1 is an elevation of my improved fork showing the joints whereby the several parts are secured together;

Figs. 2, 3 and 4, respectively, are detail views of one of the forks, the fork head forging and the fork stem before the parts are secured together;

Figs. 5 and 6, respectively, are detail views of the fork head forging and fork stem as used under the former practice of manufacturing.

As shown in the drawings the complete fork consists of the opposite fork members 1 and 2, the fork head 3, which consists preferably of a drop forging, and the fork stem 4.

The fork head as here shown consists of a central body portion 5, which has an aperture 6 formed therethrough, being substantially equal in diameter to the inside diameter of the stem 4. Extending from the body portion 5 are two opposite fork arms 8, each having formed in the lower side thereof an oval-shaped depression 9, of substantially equal size and conforming to the shape of the hollow portion of the upper butt ends of the forks 1 and 2.

A narrow rim or edge 10 is formed on the lower side of each of the fork arms 8, forming the outer edge of the depressions 9 and conforming in shape and dimensions substantially to the upper end or edge of the fork members 1 and 2 to form suitable joints therewith, and a narrow rim or raised edge 7 about the aperture 6 projects slightly above the main body portion 5 to form a suitable juncture. These raised edges, being substantially equal to the opposite contact surfaces of the parts secured thereto, provide for the most effective welding of the several parts into an integral fork.

The fork stem 4 consists of a single section of tube having its lower end $7^a$ flush to form the juncture with the edge 7 of the body portion 5.

The separate parts of the fork as above described, are secured together by a novel method or process of butt welding, thus eliminating the numerous operations incident to brazing the parts together as heretofore commonly practised, and also eliminating the reinforcing material used in connection with the fork head forging and fork stem under the old method of manufacturing.

In Fig. 5 a fork head forging of the old style having the fork reinforcing projections 11 and stem reinforcing projection 12 and $12^a$, is shown, and in Fig. 6 a fork stem of the old style having an inner reinforcing sleeve 13 is shown. The simpler form of these parts as used in the present invention and the simpler, cheaper and better construction resulting from the improved method of manufacturing will be readily understood by those experienced in this branch of manufacturing.

While the several parts that constitute the complete fork are here shown in a preferred form, it will be understood that certain departures from the exact details of arrangement may be and will be desirable in the construction of different types or styles of forks. Thus the fork head may be made of material other than a steel forging, and the fork stem may be secured thereto in some other suitable manner without affecting the welding of the forks to the fork arms; also the depressions and welding edges of the fork head may be varied from the exact form here shown without departing from the essentials of the invention.

Having thus fully described my invention, what I claim as new and desire to secure by Letters Patent, is:—

As an article of manufacture, a bicycle front fork composed of assembled parts butt-weldedly united into a complete integral structure, said parts before butt-welding comprising a separate and unreinforced fork stem, a fork head formed of one piece provided with a central aperture having a raised edge around it adapted to contact with the lower end of the stem and to be butt-welded thereto, the lower portion of the fork head being provided near its outer extremities with two oppositely disposed fork arm orifices each with a downwardly extending edge around it and two fork arms adapted to contact with said edges and to be butt-welded thereto, the corresponding opposite contact surfaces being substantially equal.

In testimony whereof I affix my signature.

ELMER M. LEWIS.